(12) United States Patent
Pan et al.

(10) Patent No.: US 8,101,669 B2
(45) Date of Patent: Jan. 24, 2012

(54) EXCHANGE MEMBRANE CONTAINING MODIFIED MALEIMIDE OLIGOMERS

(75) Inventors: Jing-Pin Pan, Hsinchu (TW); Tsung-Hsiung Wang, Hsinchu (TW); Jung-Mu Hsu, Hsinchu (TW); Peter P. Chu, Hsinchu (TW); Chien-Shun Wu, Hsinchu (TW); Bo-Jun Liu, Hsinchu (TW)

(73) Assignees: Industrial Technology Research Institute, Hsinchu (TW); National Central University, Jhongli (TW)

( * ) Notice: Subject to any disclaimer, the term of this patent is extended or adjusted under 35 U.S.C. 154(b) by 947 days.

(21) Appl. No.: 12/005,347

(22) Filed: Dec. 27, 2007

(65) Prior Publication Data

US 2008/0221325 A1   Sep. 11, 2008

(30) Foreign Application Priority Data

Dec. 29, 2006 (TW) .............................. 95149747 A

(51) Int. Cl.
*B01J 49/00*   (2006.01)
*C08J 5/20*   (2006.01)

(52) U.S. Cl. .......... 521/27; 544/299; 544/305; 544/307; 544/308; 548/521; 548/522

(58) Field of Classification Search .............. 521/27; 544/299; 548/521, 522, 548
See application file for complete search history.

(56) References Cited

U.S. PATENT DOCUMENTS

| | | | | |
|---|---|---|---|---|
| 3,766,138 A * | 10/1973 | Crivello | ........................ | 528/170 |
| 4,211,860 A * | 7/1980 | Stenzenberger | .............. | 528/312 |
| 4,237,262 A * | 12/1980 | Jones | ........................... | 528/322 |
| 4,309,512 A * | 1/1982 | Mikogami et al. | .............. | 525/58 |
| 4,539,377 A * | 9/1985 | Hefner, Jr. | ..................... | 525/401 |
| 4,609,705 A * | 9/1986 | Crivello et al. | ............... | 524/779 |
| 4,927,907 A * | 5/1990 | Corley | .......................... | 528/322 |
| 5,200,474 A * | 4/1993 | Chen et al. | ..................... | 525/426 |
| 5,268,432 A * | 12/1993 | Pan et al. | ...................... | 525/422 |
| 5,326,794 A * | 7/1994 | Pan et al. | ...................... | 523/454 |
| 5,534,146 A | 7/1996 | Netwig | | |
| 5,602,213 A * | 2/1997 | Hsu et al. | ...................... | 525/454 |
| 6,780,943 B2 * | 8/2004 | Liu et al. | ....................... | 525/502 |
| 2010/0143767 A1 * | 6/2010 | Wang et al. | ..................... | 429/40 |
| 2010/0167101 A1 * | 7/2010 | Wang et al. | ..................... | 429/33 |

OTHER PUBLICATIONS

P. Pan et al., Journal of Applied Polymer Science 45, 103-109 (1992).*
J. Roziere et al., Annu. Rev. Mater. Res. 33, 503-555, 514 (2003).*
J. Kerres et al., Solid State Ionics 125, 243-249 (1999).*
S. Mirozoeva et al. J. Med. Chem. 45, 563-566 (2002).*
Hickner et al, Chem. Rev. 104, 4587-4612, 4587 (2004).*
J. Lee et al., J. Ind. Eng. Chem, 12(2), 175 (2006).*
TW Office Action, Appl. No. 096127417, Sep. 15, 2011, pp. 1-4.

* cited by examiner

*Primary Examiner* — James O Wilson
*Assistant Examiner* — Alexander R Pagano
(74) *Attorney, Agent, or Firm* — Birch, Stewart, Kolasch & Birch, LLP

(57) ABSTRACT

An exchange membrane containing modified maleimide oligomers comprising sulfonated poly(aryl ether ketone) (S-PAEK) and modified maleimide oligomers. The exchange membrane uses the modified maleimide oligomers having a hyper-branched architecture as matrix, and introduces them into S-PAEK to constitute semi-interpenetration network (semi-IPN), so as to intensify water holding capacity, chemical resistance, the electrochemical stability and thermal resistance of the ionic/proton exchange membrane. The exchange membrane can be used to fabricate the membrane electrode assemblies, fuel cells, and be applied them to the fields of seawater desalination, heavy water and sewage treatment, and biomass-energy resources.

18 Claims, 6 Drawing Sheets

EXCHANGE MEMBRANE CONTAINING MODIFIED MALEIMIDE OLIGOMERS

FIELD OF INVENTION

The present invention relates to exchange membranes containing modified maleimide oligomers, and more particularly, to an ionic/protonic exchange membrane containing modified maleimide oligomers.

DESCRIPTION OF RELATED ART

In recent years, the development of protonic exchange membrane fuel cells is driven by factors like advancement of membrane properties of protonic exchange membranes, increases in power densities of fuel cell stacks, and drops in prices of catalysts and usage rates, such that the protonic exchange membrane fuel cells are gradually becoming commercially competitive. The application of the protonic exchange membrane fuel cells has a strong potential in future markets.

Protonic exchange membranes play an important role as solid electrolytes in protonic exchange membrane fuel cells. Perfluorinate ionomer membranes are by far the best materials for applications at low temperatures, wherein Nafion, which has excellent conductivity, is most widely used. The backbone of Nafion is similar to a Teflon structure, and cationic exchange groups, sulfo groups ($-SO_3H$), are appended to the backbone via side chains. Basically, ionic/protonic exchange membranes are made from sulfonated perfluorinate polymers. The ionic/protonic exchange membranes have good ionic conductivity and chemical stability, but preparations of the ionic/protonic exchange are very complicated and expensive. Because the mechanical strengths of the membranes are insufficient and the applied thicknesses are often required to be over 100 μm, Ohm impedance cannot be lowered. Thus, the conductivity of their ions/protons is affected.

Sulfonated heat-stable thermoplastic polymers (including poly(aryl ether ketones)(PAEKs)) are the primary research objective for non-fluoro ion/proton exchange membranes, and they are widely studied and developed into applicable ion/proton exchange membrane materials. However, the ion/proton exchange membranes made from PAEKs all need to be in substantially humid environments to maintain normal functioning. Therefore, applications of the ion/proton exchange membranes are limited, if they can only be used in operating environments below 100° C. Moreover, the type of exchange membrane has a very high methanol permeability rate, which causes seeping of methanol, and, in turn, leads to a substantial increase in the anode and lowers the performance of the cell. The results caused by the aforementioned drawbacks usually directly affect the transmission of protons and the delivery and transmission mechanism of water molecules, such that the overall performance of the membranes is lowered.

Accordingly, an ion/proton exchange membrane with effectively increased water holding capacity, chemical resistance, electrochemical stability, mechanical strength, heat stability, pliability and reduced production costs is required.

SUMMARY OF THE INVENTION

In light of the shortcomings of the above prior arts, it is an object of the invention is to provide an exchange membrane containing modified maleimide oligomers, which has strong water holding capacity.

It is another object of this invention to provide an exchange membrane containing modified maleimide oligomers, which has high chemical resistance.

It is still another object of the invention provide an exchange membrane containing modified maleimide oligomers, which has excellent electrochemical stability.

It is a further object of the invention to provide an exchange membrane containing modified maleimide oligomers, which has high heat tolerance.

In accordance with the foregoing and other objectives, the invention proposes an exchange membrane containing modified maleimide oligomers, including sulfonated poly (arylether ketones) (S-PAEKs) and modified maleimide oligomers. The exchange membrane is modified from barbituric acid, and the modified maleimide oligomers with a hyper-branched architecture is used as matrix to be introduced into S-PAEKs to form a semi-interpenetration network (semi-IPN) to thereby enhance water holding capacity, chemical resistance, electrochemical stability and heat tolerance of the ion/proton exchange membrane. The exchange membrane can be used in fabricating membrane electrode assemblies and fuel cells, or is applicable in fields of seawater desalination, heavy water and sewage treatment and biomass-energy resources.

DETAILED DESCRIPTION OF THE PREFERRED EMBODIMENTS

Figure 1A:
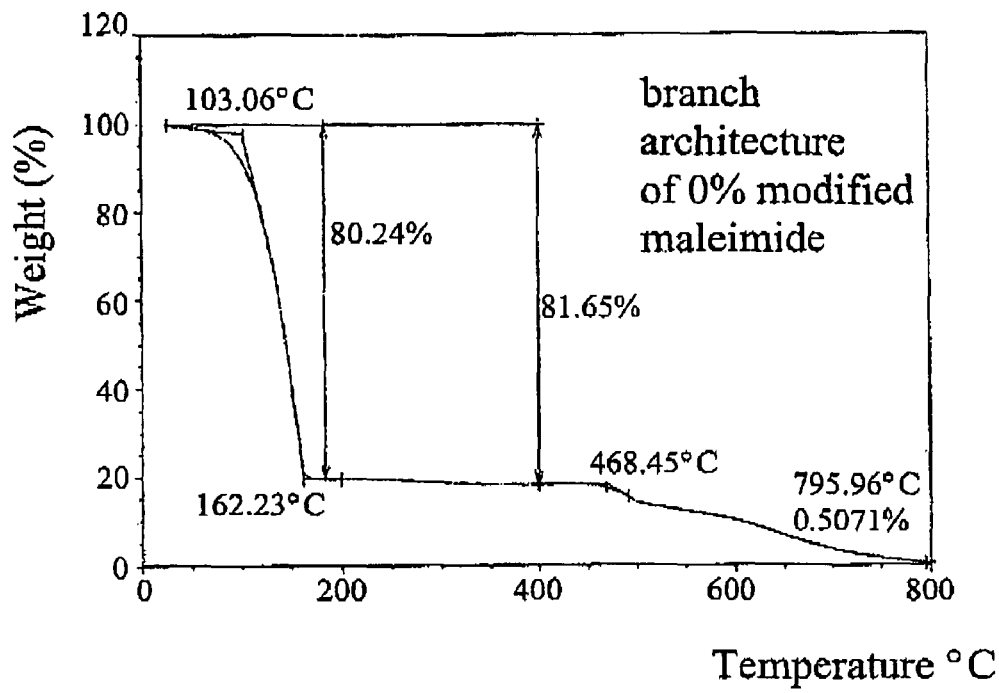
FIGS. 1a to 1e show the levels of water holding capacity of modified maleimide oligomers with different proportions of branched structure.
Figure 1B:
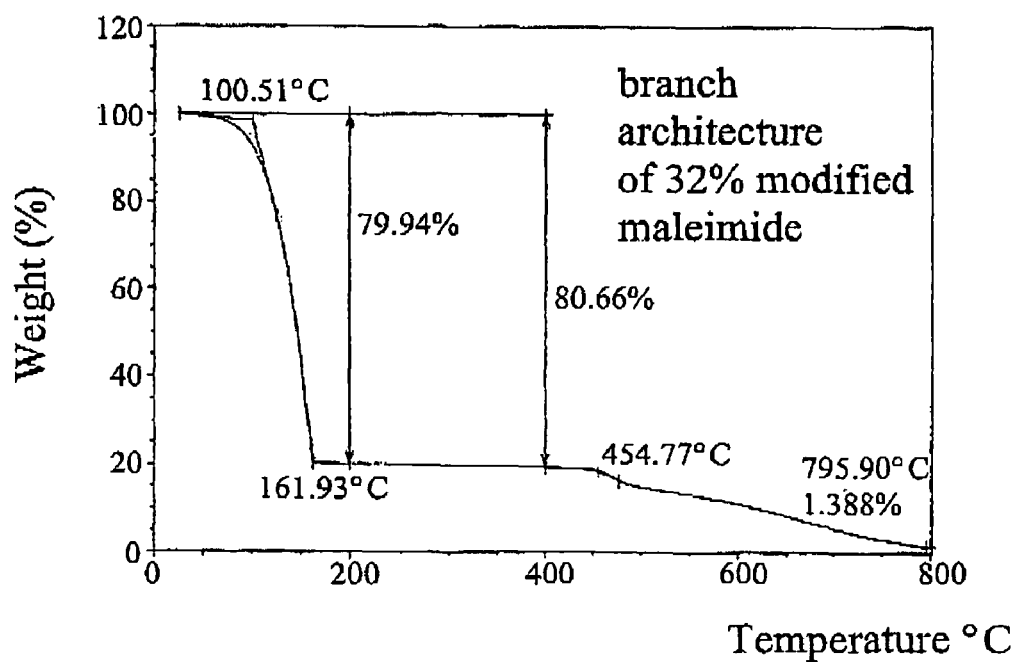
Figure 1C:
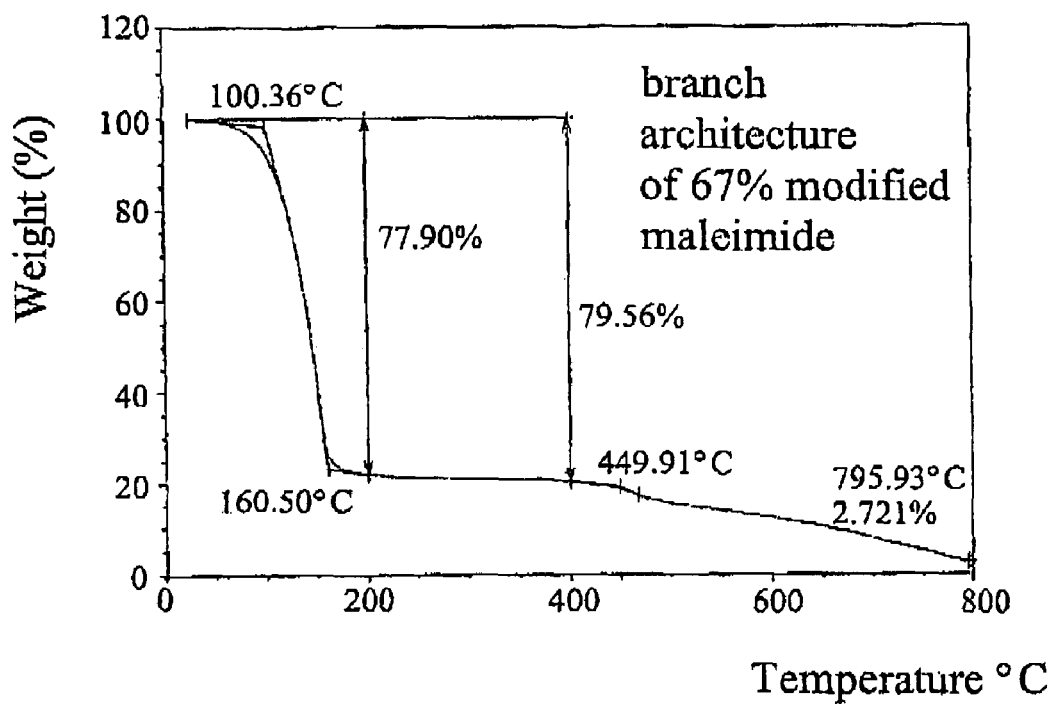
Figure 1D:
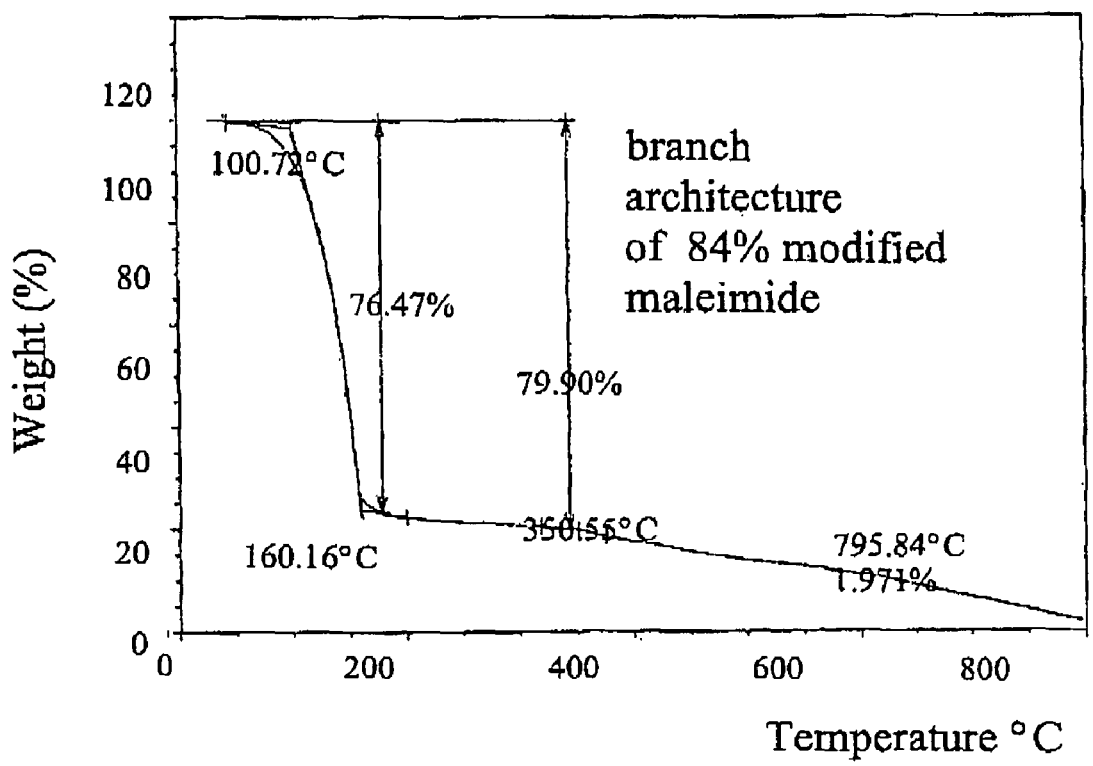
Figure 1E:
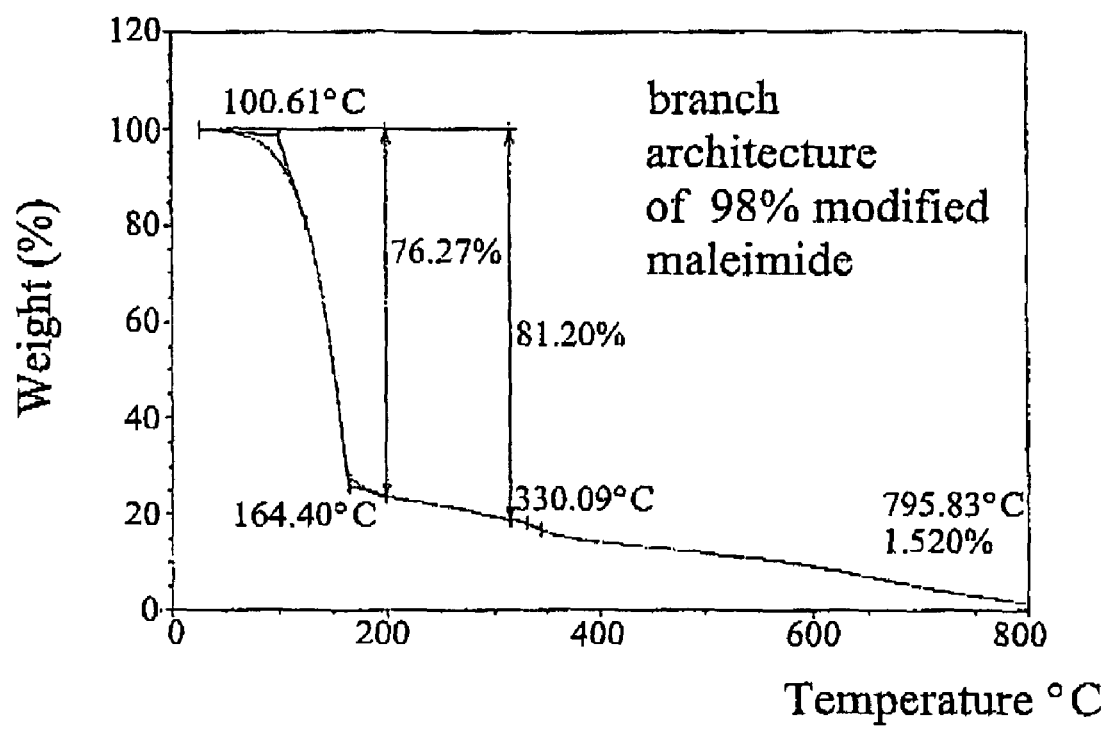

The invention includes an exchange membrane containing modified maleimide oligomers, including S-PAEKs and modified maleimide oligomers. Generally, the weight ratio of S-PAEKs to the modified maleimide oligomers is in the range of 99.95:0.05 to 50:50; preferably, the ratio is in the range of 99:1 to 90:10.

Because intermolecular hydrogen bonds among PAEKs molecules are strengthened as the degrees of sulfonation increased, thereby improving heat tolerance, electrochemical stability and conductivity of PAEKs. In one embodiment, concentrated sulfuric acid is used for sulfonation of poly (ether ether ketone) (PEEK):

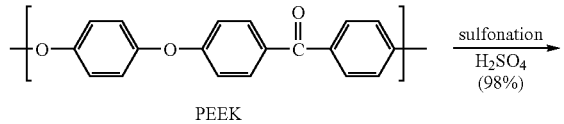

PEEK

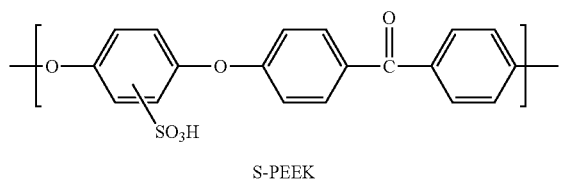

S-PEEK

By adjusting reaction conditions and environments, S-PEEKs with different degrees of sulfonation may be obtained. Usually, the conductivity of S-PAEKs with 60% sulfonation could be as high as 6×10⁻² (25° C.), and the glass transition temperature of S-PAEKs with 80% sulfonation could increase to 210° C. S-PAEKs have better solvent miscibility, which is favorable to preparation into liquids to improve membrane processing. Generally, the degree of sulfonation of S-PAEKs of the invention is in the range of 5% and 95%, and is preferably in the range of 45% and 75%. Examples of S-PAEKs include, but not limited to, sulfonated poly(ether ketone) (S-PEK), sulfonated poly(ether ether ketone) (S-PEEK), sulfonated poly(ether ether ketone ketone) (S-PEEKK) and sulfonated poly(ether ketone ether ketone ketone) (S-PEKEKK).

In the exchange membrane of the invention, the modified maleimide oligomers used as matrix have a hyper-branched architecture. The modified maleimide oligomers are formed by branching or sequence reactions between maleimide and barbituric acid or its derivatives or other initiators that can provide reactive free radicals. After a specific reaction period, the reaction could be terminated by adding maleimide or monomers of its derivatives to adjust the degrees of branching and polymerization, to control conformation of the architecture and the molecular weight, to obtain modified maleimide oligomers. Then, oligomers with similar architectures are separated from the modified maleimide oligomers by the extraction technique. The hyper-branched architecture can increase solvent solubility of maleimide oligomers and compatibility with resins, so that the maleimide oligomers can easily form composite materials with epoxy resins, polyamide resins or other resins to increase overall glass transition temperatures, rigidity and heat stability.

In one embodiment, barbituric acid (BTA) or its derivatives represented by formula (I) are used:

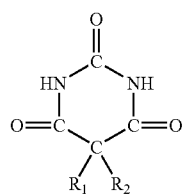

(I)

wherein $R_1$ and $R_2$ may be independently selected from —H, —CH₃, —C₂H₅, —C₆H₅, —CH(CH₃)₂, —CH₂CH(CH₃)₂, —CH₂CH₂CH(CH₃)₂ or —CH(CH₃)—CH₂—CH₂—CH₃.

BTA is obtained by polymerization in the condition that maleimide in a solvent or a co-solvent is present. Maleimide may be bismaleimide represented by formula (II):

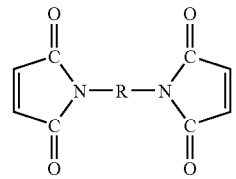

(II)

In formula (II), R may be —(CH₂)ₙ—, $1 \leq n \leq 20$; —[C(CH₂)₂]ₘ—, $1 \leq m \leq 20$; —[CH₂—C(CH₃)₂]ₚ, $1 \leq p \leq 10$,

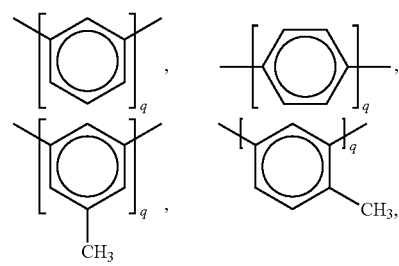

$1 \leq p \leq 10$); or bismaleimide represented by formula (III):

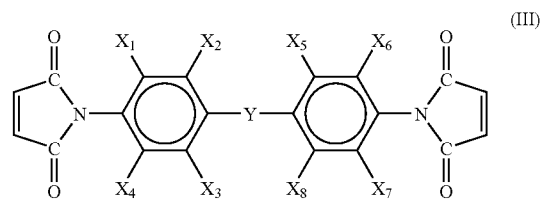

(III)

wherein Y may be R, SO₂, S, O, CONH and C(CF₃)₂; $X_1$ to $X_8$ may be independently selected from R, H, F, Cl, Br, HSO₃ and SO₂.

Embodiments of maleimide includes, but not limited to, N,N'-ethylene-bismalemide, N,N'-butylene-bismalemide, N,N'-hexamethylene-bismalemide, N,N'-phenylene-bismaleimide, N,N'-4,4'-diphenylmethane-bismaleimide, N,N'-4,4'-diphenylether-bismaleimide, N,N'-4,4'-diphenylsulfone-bismaleimide, N,N'-4,4'-dicyclohexylmethane-bismaleimide, N,N'-4,4'-phenyldimethyl-bismaleimide and N,N'-4,4'-diphenylcyclohexane-bismaleimide.

In this embodiment, the molar ratio of bismaleimide and barbituric acid or its derivatives is in the range of 30:1 to 3:1, and preferably in the range of 20:1 to 10:1, to carry out polymerization. Examples of the solvents used in the reaction include, but not limited to, γ-butyrolactone, propylene carbonate (PC) and N-Methyl-2-Pyrrolidone (NMP). Preferably, a solution with a solid content of 10 to 60 weight % is stirred for 0.5 to 6 hours in the range of 100 to 145° C., to carry out the reaction.

The modified maleimide oligomers with a hyper-branched architecture, used by the invention, can be easily mixed with S-PEAKs, such as NMP, to carry out thermal cross-linking under heat to form exchange membranes with semi-IPN. The modified maleimide oligomers used as matrix in exchange membranes, of the invention, has a hyper-branched architecture with better water holding capacity. FIGS. 1a to 1e show the levels of water holding capacity of the modified maleimide oligomers with different proportions of branched structures. Therefore, the invention includes S-PAEKs, and the exchange membranes containing modified maleimide oligomers have better mechanical strength. The exchange membrane can also increase the glass transition temperature and heat stability, while increasing water holding capacity and decreasing the level of swelling. Further, the exchange membrane can avoid acid leaching and increases proton conversions, and has excellent chemical resistance and electrochemical stability to be used as ion/proton exchange membranes to be used in fabrication of membrane electrode assemblies and fuel cells, or be applied in fields such as seawater desalination, heavy water and sewage treatment and biomass-energy resources.

EXAMPLE 1

Preparation of Modified Bismaleimide Oligomers

The reactants, N,N'-4,4'-diphenylmethane-bismaleimide and BTA (molar ratio of 10:1), are placed in a reactor. Then, γ-butyrolactone with a solid content of 20 weight % is added to the reactor. A reaction is carried out by heating to 130° C. for 5 hours to obtain modified maleimide oligomers.

EXAMPLE 2

Preparation of S-PEEK (93% Sulfonation)

Vitrex PF 450 was placed in an oven, and then baked for 2 hours at 110° C. The baked Vitrex PF 450 was placed in a round bottom flask, and concentrated sulfuric acid (95 to 98%) was gradually poured into the flask. The weight ratio of Vitrex PF 450 to sulfuric acid was 1:10. By stirring mechanically, rotating at 900 rpm and heating to 45° C., nitrogen gas was introduced into the reaction. Duration of the reaction was 7 hours. After the reaction time was up, the solution was poured into ice water while stirring, to form S-PEEK precipitate. Then, the S-PEEK precipitate was washed with deionized water to obtain a solution with pH>6. The obtained S-PEEK were placed in an oven set at 80° C., which was then set to 110° C., and vacuum was applied for two hours to obtain a yellow solid of S-PEEK (93% sulfonation) after water was mostly removed. The yellow solid was subsequently placed in a desiccator.

EXAMPLE 3

Preparation of S-PEEK (93% Sulfonation)

Vitrex PF 450 was placed in an oven, and then baked for 2 hours at 110° C. The baked Vitrex PRF 450 was placed in a round bottom flask, and concentrated sulfuric acid (95 to 98%) was gradually poured into the flask while bathing. The weight ratio of Vitrex PF 450 to sulfuric acid was 1:10. By stirring mechanically, rotating at 900 rpm and heating to 45° C., nitrogen gas was introduced into the reaction. Duration of the reaction was 7 hours. After the reaction time was up, the solution was poured into ice water while stirring, to form S-PEEK precipitate. Then, the S-PEEK precipitate was washed with deionized water to obtain a solution with pH>6. The obtained S-PEEK was placed in an oven set at 80° C., which was then set to 110° C., and vacuum was applied for two hours to obtain a yellow solid of S-PEEK (56% sulfonation) after water was mostly removed. The yellow solid was subsequently placed in a desiccator.

COMPARATIVE EXAMPLE 1

Preparation of S-PEEK Membranes

S-PEEK was placed in a serum bottle containing NMP solvent. The serum bottle was transferred to an oil bath at 80° C., and was stirred to dissolve S-PEEK in NMP solvent to form a coatable solution with a solid content of 10 weight %. A scraper with a gap of 1500 μm was used to coat the S-PEEK solution onto glass substrate, which was then placed into an oven set at 80° C. for baking into a membrane. After filming, the temperature was increased to 110° C. and vacuum was applied to remove residual solvent. Finally, the produced S-PEEK membrane was soaked in 60° C., 0.5M sulfuric acid for 2 hours, and later transferred to 60° C. deionized water to obtain an aqueous solution with pH>6. The obtained yellowish transparent S-PEEK membrane had a thickness of 80 to 120 μm.

TEST EXAMPLE

Measurements of water uptake (WU) and solvent uptake (SU) were performed by soaking membrane samples, respectively, into distilled water, methanol with 10% vol, methanol with 30% vol, and were heated to 60° C. for 1 hour. The samples were placed in vacuum oven set at 80° C. to dry for 2 hours, and then weighed. WU and SU were calculated according to the following equation:

$$WU/SU=(W_{wet}-W_{dry})/W_{dry} \times 100\%$$

$W_{wet}$ and $W_{dry}$ represent the weight of dry membrane and swelling membrane, respectively.

Embodiment 1

Modified maleimide oligomers obtained in EXAMPLE 1 were added by 1 weight % to S-PEEK (93% sulfonation) obtained in EXAMPLE 2. Then, NMP solvent was added to give a weight ratio of 1:10 of the S-PEEK to NMP solvent. The mixture was dissolved by oscillation in an oscillator, and the solution was thoroughly mixed at room temperature to obtain a yellow viscous solution after the dissolution. A scraper with a gap of 1500 μm was used to coat the S-PEEK solution onto a glass substrate, which was then placed into an oven set at 180° C. for thermal cross-linking for 6 hours. Finally, the obtained membrane was soaked in 60° C., 0.5M sulfuric acid for acid wash for 2 hours. After acid washing, the membrane was placed in 60° C. deionized water for wash to a solution with pH>6 to obtain brownish, yellow transparent S-PEEK/modified bismaleimide oligomers with a hyperbranched architecture with a thickness of 80 to 120 μm. Test results of filming and properties are recorded in Table 1 and Table 2, respectively.

Embodiments 2-4

Steps in EMBODIMENT 1 were repeated. The amounts of modified maleimide oligomers added were changed to 2 weight %, 3.5 weight % and 5 weight %, respectively. Test results of filming and properties are recorded in Table 1 and Table 2, respectively.

Embodiment 5

Modified maleimide oligomers obtained in EXAMPLE 1 were added by 1 weight % to S-PEEK (93% sulfonation) obtained in EXAMPLE 2. Then, NMP solvent was added to give a weight ratio of 1:10 of the S-PEEK to NMP solvent. The mixture was dissolved by oscillation in an oscillator, and the solution was thoroughly mixed at room temperature to obtain a yellow viscous solution after the dissolution. A scraper with a gap of 1500 μm was used to coat the S-PEEK solution onto a glass substrate, which was then placed into an oven set at 180° C. for thermal cross-linking for 20 hours. Finally, the obtained membrane was soaked in 60° C., 0.5M sulfuric acid for acid wash for 2 hours. After acid washing, the membrane was placed in 60° C. deionized water for wash to a solution with pH>6 to obtain brownish, yellow transparent S-PEEK/modified bismaleimide oligomers with a hyper-branched architecture with a thickness of 80 to 120 μm. Test results of filming and properties are recorded in Table 1 and Table 2, respectively.

Embodiments 6-8

Figure 2:
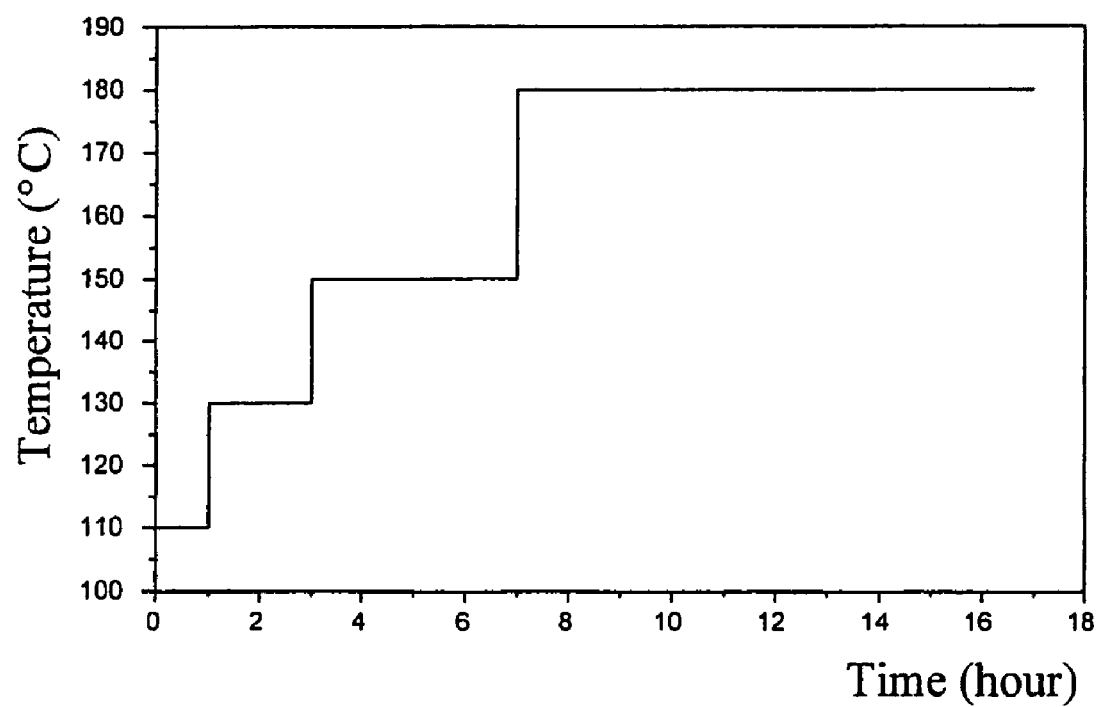
FIG. 2 shows the temperature gradients in the thermal cross-linking reactions in EMBODIMENTS 9 to 11 of the invention.

Steps in EMBODIMENT 5 were repeated. The amounts of modified maleimide oligomers added were changed to 2 weight %, 3.5 weight % and 5 weight %, respectively. Test results of filming and properties are recorded in FIGS. 1 and 2.

with hyper-branched architectures increases. As the time of thermal cross-linking of membranes increase, the effects on conductivity are greater. That is, under the same conditions, the IPN formed in the bismaleimide oligomers in high S-PEEK molecules is more complete. Therefore, the membranes have substantially lowered swelling effect in water or methanol.

Figure 4:
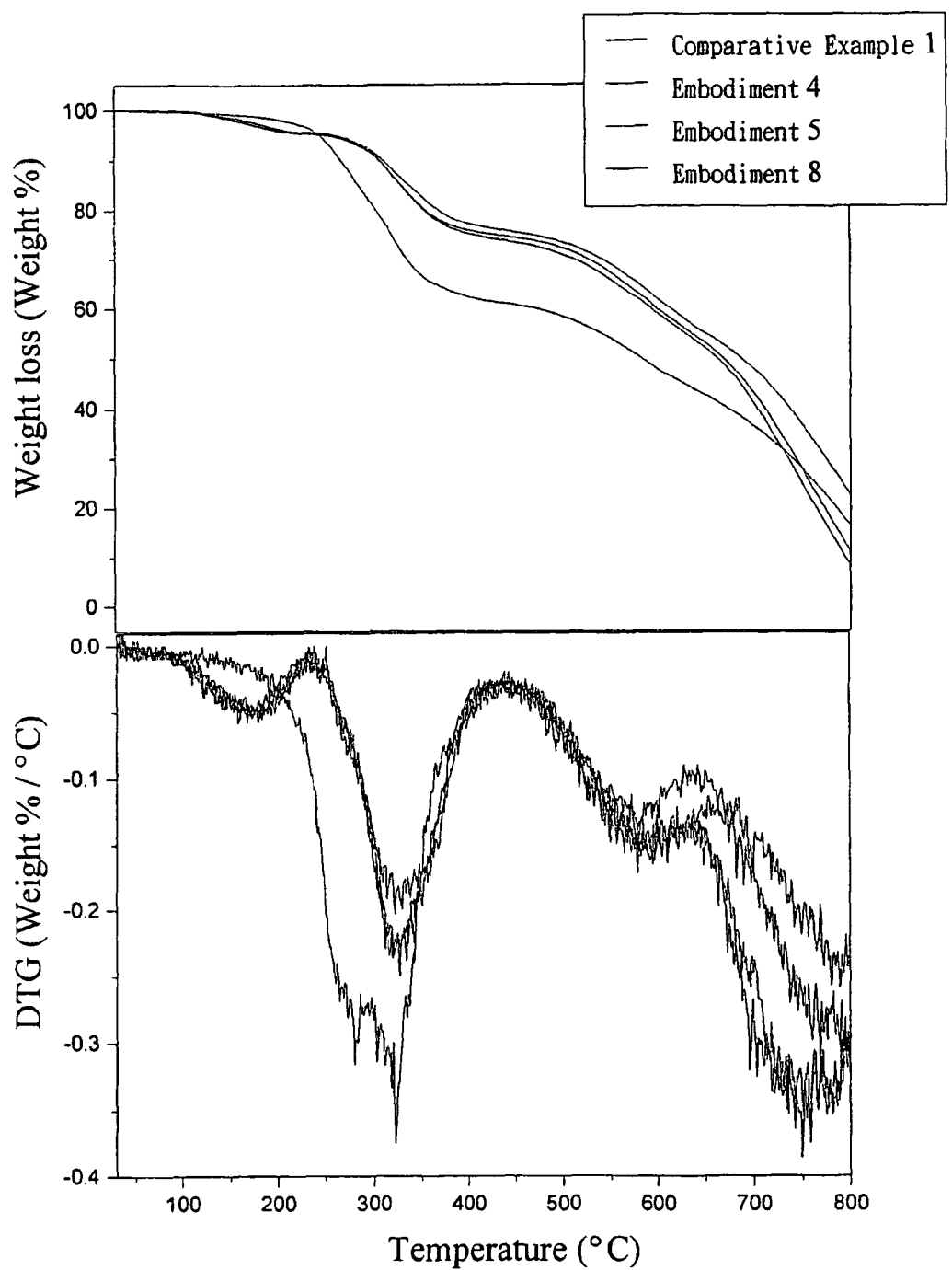
FIG. 4 shows the results of the thermal gravimetic analysis (TGA) of bismaleimide oligomeric membranes with a S-PEEK and S-PEEK/bismaleimide with a hyper-branched architecture.

FIG. 4 is TGA result of bismaleimide with S-PEEK and S-PEEK/bismaleimide oligomers with hyper-branched architectures. Water molecules were lost at a thermal decomposition temperature about 170° C., and the water molecules in S-PEEK membrane of comparative example 1 were all lost at lower than 100° C. That is, naïve S-PEEK membranes did not have water holding capacity at >100° C. environments. But when bismaleimide oligomers with a hyper-branched architecture form a delicate IPN in S-PEEK, the effect of water holding capacity is good. At a thermal decomposition temperature about 340° C., sulfo is cleaved. The thermal decomposition temperatures in EMBODIMENTS 4, 5 and 8 are all higher than that of the S-PEEK membranes, showing that the cross-linking agent, bismaleimide oligomers with a

TABLE 1

|  | Reaction temperature/time | Sulfonated poly(ether ether ketone)(S-PEEK) (93% sulfonation) | Modified maleimide oligomers (Example 1) | Appearance |
| --- | --- | --- | --- | --- |
| Comparative Example 1 | 80° C. | 100 | — | Yellow transparent membrane with good filming and flexibility |
| Embodiment 1 | 180° C./6 hours | 99 | 1 | Brownish yellow transparent membrane with good filming and flexibility |
| Embodiment 2 |  | 98 | 2 | Brownish yellow transparent membrane with good filming and flexibility |
| Embodiment 3 |  | 96.5 | 3.5 | Brownish yellow transparent membrane with good filming and flexibility |
| Embodiment 4 |  | 95 | 5 | Brownish yellow transparent membrane with good filming and flexibility |
| Embodiment 5 | 180° C./20 hours | 99 | 1 | Brownish yellow transparent membrane with good filming and flexibility |
| Embodiment 6 |  | 98 | 2 | Brownish yellow transparent membrane with good filming and flexibility |
| Embodiment 7 |  | 96.5 | 3.5 | Brownish yellow transparent membrane with good filming and flexibility |
| Embodiment 8 |  | 95 | 5 | Brownish yellow transparent membrane with good filming and flexibility |

TABLE 2

|  | WU(%) | SU (10 vol %) | SU (30 vol %) | σ(S/cm) | thickness (μm) | resistance (Ω) |
| --- | --- | --- | --- | --- | --- | --- |
| Comparative Example 1 | 137 | — | — | $2.63 \times 10^{-2}$ | 440 | 2.5 |
| Embodiment 1 | 52.8 | 45.1 | 752.6 | $1.36 \times 10^{-2}$ | 100 | 1.1 |
| Embodiment 2 | 51.4 | 22.5 | 307.8 | $9.07 \times 10^{-3}$ | 80 | 1.3 |
| Embodiment 3 | 51.7 | 62.3 | 104.4 | $7.52 \times 10^{-3}$ | 130 | 2.6 |
| Embodiment 4 | 47.3 | 58.2 | 102.3 | $6.67 \times 10^{-3}$ | 100 | 2.2 |
| Embodiment 5 | 44.95 | 50.6 | 61.61 | $5.84 \times 10^{-3}$ | 180 | 4.6 |
| Embodiment 6 | 36.36 | 46.4 | 58.33 | $3.72 \times 10^{-3}$ | 160 | 6.4 |
| Embodiment 7 | 30.22 | 37.58 | 50.43 | $2.29 \times 10^{-3}$ | 200 | 13.0 |
| Embodiment 8 | 38.32 | 64.81 | 68.69 | $1.04 \times 10^{-3}$ | 80 | 11.5 |

The above results show that conductivity of membranes is lowered, as the amount of bismaleimide cross-linking agent hyper-branched architecture, indeed forms a cross-linking architecture in high molecules and stabilizes heat stability of sulfo.

Embodiment 9

Modified maleimide oligomers obtained in EXAMPLE 1 were added by 1 weight % to S-PEEK (93% sulfonation) obtained in EXAMPLE 2. Then, NMP solvent was added to give a weight ratio of 1:10 of the S-PEEK to NMP solvent. The mixture was dissolved by oscillation in an oscillator, and the solution was thoroughly mixed at room temperature to obtain a yellow viscous solution after the dissolution. A scraper with a gap of 1500 μm was used to coat the S-PEEK solution onto a glass substrate, and a thermal cross-linking reaction was then performed according to the temperature gradient illustrated, in FIG. 2, for thermal cross-linking. Finally, the obtained membrane was soaked in 60° C., 0.5M sulfuric acid for acid wash for 2 hours. After acid washing, the membrane was placed in 60° C., deionized water for wash to a solution with pH>6 to obtain brownish, yellow transparent S-PEEK/modified bismaleimide oligomers with a hyper-branched architecture with a thickness of 80 to 120 μm. Test results of filming and properties are recorded in Table 3 and Table 4, respectively.

Embodiments 10 and 11

Figure 3:
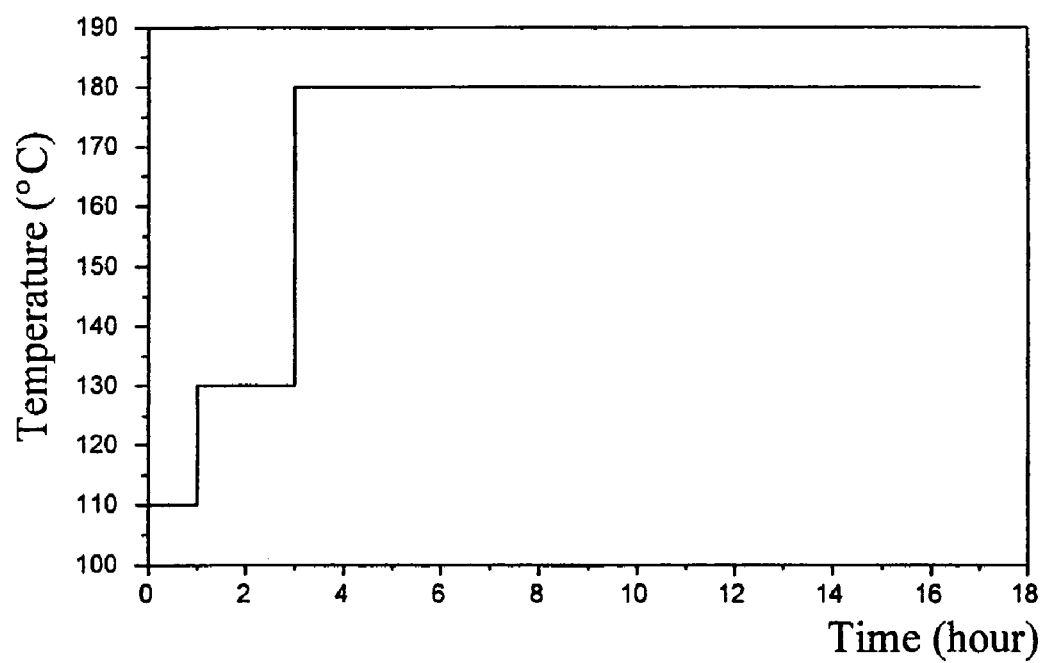
FIG. 3 shows the temperature gradients in the thermal cross-linking reactions in EMBODIMENTS 12 to 17 of the invention.

Steps in EMBODIMENT 9 were repeated. The amounts of modified maleimide oligomers added were changed to 2 weight %, 3.5 weight % and 5 weight %, respectively. Test results of membrane formation and properties are recorded in FIGS. 3 and 4.

Embodiment 12

Modified maleimide oligomers obtained in EXAMPLE 1 were added by 1 weight % to S-PEEK (93% sulfonation) obtained in EXAMPLE 2. Then, NMP solvent was added to give a weight ratio of 1:10 of the S-PEEK to NMP solvent. The mixture was dissolved by oscillation in an oscillator, and the solution was thoroughly mixed at room temperature to obtain a yellow viscous solution after the dissolution. A scraper with a gap of 1500 μm was used to coat the S-PEEK solution onto a glass substrate, and a thermal cross-linking reaction was then performed according to the temperature gradient illustrated, in FIG. 3, for thermal cross-linking. Finally, the obtained membrane was soaked in 60° C., 0.5M sulfuric acid for acid wash for 2 hours. After acid washing, the membrane was placed in 60° C., deionized water for wash to a solution with pH>6 to obtain brownish, yellow transparent S-PEEK/modified bismaleimide oligomers with a hyper-branched architecture with a thickness of 80 to 120 μm. Test results of filming and properties are recorded in Table 3 and Table 4, respectively.

Embodiments 13 and 14

Steps in EMBODIMENT 12 were repeated. The amounts of modified maleimide oligomers added were changed to 3.5 weight % and 5 weight %, respectively. Test results of membrane formation and properties are recorded in Table 3 and Table 4.

TABLE 3

| | Reaction temperature/time | Sulfonated poly(ether ether ketone)(S-PEEK) (93% sulfonation) | Modified maleimide oligomers (Example 1) | Appearance |
|---|---|---|---|---|
| Comparative Example 1 | 80° C. | 100 | — | Yellow transparent membrane with good filming and flexibility |
| Embodiment 9 | (see FIG. 2) | 99 | 1 | Brownish yellow transparent membrane with good filming and flexibility |
| Embodiment 10 | | 98 | 2 | Brownish yellow transparent membrane with good filming and flexibility |
| Embodiment 11 | | 95 | 5 | Brownish yellow transparent membrane with good filming and flexibility |
| Embodiment 12 | (see FIG. 3) | 98 | 2 | Brownish yellow transparent membrane with good filming and flexibility |
| Embodiment 13 | | 96.5 | 3.5 | Brownish yellow transparent membrane with good filming and flexibility |
| Embodiment 14 | | 95 | 5 | Brownish yellow transparent membrane with good filming and flexibility |

TABLE 4

| | WU(%) | SU(30 vol %) | σ(S/cm) |
|---|---|---|---|
| Embodiment 9 | 1756 | — | $1.10 \times 10^{-2}$ |
| Embodiment 10 | 332 | 928 | $2.82 \times 10^{-2}$ |
| Embodiment 11 | 184 | 606 | $1.43 \times 10^{-2}$ |
| Embodiment 12 | 123 | NA | $8.28 \times 10^{-3}$ |
| Embodiment 13 | 691 | NA | $1.00 \times 10^{-2}$ |
| Embodiment 14 | 1333 | NA | $8.32 \times 10^{-3}$ |

The above-described results show that conductivity is not greatly reduced after addition of the cross-linking agent, bismaleimide oligomers with a hyper-branched architecture. Even at 5 weight % of cross-linking agent, conductivity is $1.43 \times 10^{-2}$ S/cm. In the measurement results of WU, higher water absorption occurred because addition of 1 weight % bismaleimide oligomers with a hyper-branched architecture could not suppress swelling of the membranes in EMBODIMENT 9. However, naïve S-PEEK membranes are completely dissolved at 60° C. On the contrary, the addition of bismaleimide with a hyper-branched architecture increased thermal tolerance and suppressed swelling of S-PEEK membranes, to exhibit the advantages of their increased membrane properties. As the amount of bismaleimide cross-linking agent increased, the suppressed amount of water absorption was more apparent. Although the membrane in EMBODIMENT 9 still has the ability to suppress swelling slightly, dissolution caused by destruction in 30 vol % of methanol could not be avoided. However, such a phenomenon occurs less frequently as the amount of bismaleimide cross-linking agents was increased.

In the results showed in EMBODIMENTS 12 to 14, conductivity was not lowered as the amount of maleimide cross-linking agent increased. Therefore, a temperature control process could be applied to maintain uniform dispersion and conductivity to achieve excellent effects.

Embodiment 15

Modified maleimide oligomers obtained in EXAMPLE 1 were added by 2 weight % to S-PEEK (56% sulfonation) obtained in EXAMPLE 3. Then, NMP solvent was added to give a weight ratio of 1:10 of the S-PEEK to NMP solvent. The mixture was dissolved by oscillation in an oscillator, and the solution was thoroughly mixed at room temperature to obtain a yellow viscous solution after the dissolution. A scraper with a gap of 1500 μm was used to coat the S-PEEK solution onto a glass substrate, and a thermal cross-linking reaction was then performed according to the temperature gradient illustrated, in FIG. 3, for thermal cross-linking. Finally, the obtained membrane was soaked in 60° C., 0.5M sulfuric acid for acid wash for 2 hours. After acid washing, the membrane was placed in 60° C., deionized water for wash to a solution with pH>6 to obtain brownish, yellow transparent S-PEEK/modified bismaleimide oligomers with a hyper-branched architecture with a thickness of 80 to 120 μm. Test results of filming and properties are recorded in Table 5 and Table 6, respectively.

Embodiments 16 and 17

Steps in EMBODIMENT 15 were repeated. The amounts of modified maleimide oligomers added were changed to 3.5 weight % and 5 weight %, respectively. Test results of membrane formation and properties are recorded in Table 5 and Table 6.

TABLE 5

| | Reaction temperature/time | Sulfonated poly(ether ether ketone)(S-PEEK) (93% sulfonation) | Modified maleimide oligomers (Example 1) | Appearance |
|---|---|---|---|---|
| Comparative Example 1 | 80° C. | 100 | — | Yellow transparent membrane with good filming and flexibility |
| Embodiment 15 | (see FIG. 3) | 98 | 2 | Brownish yellow transparent membrane with good filming and flexibility |
| Embodiment 16 | | 96.5 | 3.5 | Transparent membrane with good filming and flexibility |
| Embodiment 17 | | 95 | 5 | Transparent membrane with good filming and flexibility |

TABLE 6

| | WU(%) | σ(S/cm) |
|---|---|---|
| Embodiment 15 | 19 | $4.09 \times 10^{-3}$ |
| Embodiment 16 | 23 | $7.74 \times 10^{-3}$ |
| Embodiment 17 | 39 | $2.69 \times 10^{-3}$ |

The above-described results showed that membranes prepared from S-PEEK with 56% sulfonation haVE good filming and flexibility. S-PEEK with low degrees of sulfonation was used in the process, and therefore, conductivity of the membranes prepared was lower than those in the previous embodiments. The temperature gradients used in preparing the membranes were the same as those in EMBODIMENTS 12 to 14, and its conductivity decreased as the amount of bismaleimide cross-linking agent increased.

In conclusion, bismaleimide oligomers with a hyper-branched architecture could indeed form an IPN in S-PEEK molecules, to effectively suppress excessive swelling or dissolution in water or methanol. However, the balance between conductivity and swelling are still dependent upon the architecture, the amounts and the cross-linking time of the cross-linking agents and the degrees of sulfonation. Moreover, the bismaleimide cross-linking agent is more uniformly dispersed in the membranes by applying the temperature gradient process, and the microstructure of S-PEEK is more complete. Also, the temperature control process could control cross-linking rates during the cross-linking period, to form a more complete and delicate IPN.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An exchange membrane containing modified maleimide oligomers, comprising sulfonated poly(arylether ketones) (S-PAEKS) and modified maleimide oligomers as matrix, wherein the modified maleimide oligomers are formed by performing a thermal cross-linking reaction between barbituric acid and bismaleimide, and wherein the barbituric acid is the structure represented by formula (I) below:

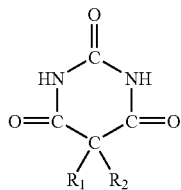

wherein $R_1$ and $R_2$ are independently selected from the group consisting of —H, —$CH_3$, —$C_2H_5$, —$C_6H_5$, —$CH(CH_3)_2$, —$CH_2CH_2CH(CH_3)_2$ and —$CH(CH_3)$—$CH_2$—$CH_2$—$CH_3$, and the bismaleimide is one of the structure represented by formula (II) below:

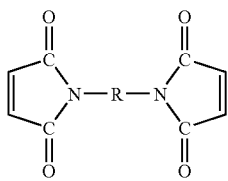

wherein R is independently selected from the group consisting of —$(CH2)_n$-, in which $1 \leq n \leq 20$, —[$C(CH_2)_2]_m$—, in which $1 \leq m \leq 20$, —[$CH_2$—$C(CH_3)_2]_p$, in which $1 \leq p \leq 10$,

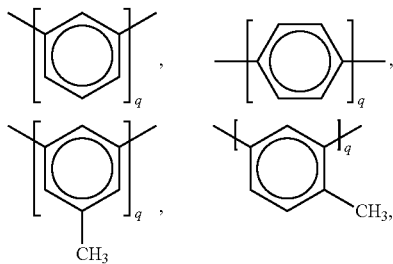

in which $1 \leq q \leq 10$, and the structure represented by formula (III) below:

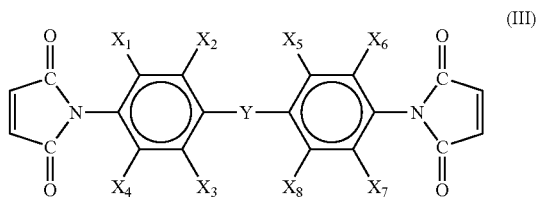

wherein Y is selected from the group consisting of R, $SO_2$, S, O, CONH and $C(CF_3)_2$; and $X_1$ to $X_8$ are independently selected from R, H, F, Cl, Br, $HSO_3$ and $SO_2$.

2. The exchange membrane of claim 1, wherein a weight ratio of S-PAEKS and the modified maleimide oligomers is in the range of 99.95:0.05 to 50:50.

3. The exchange membrane of claim 1, wherein a weight ratio of S-PAEKS and the modified maleimide oligomers is in the range of 99:1 to 90:10.

4. The exchange membrane of claim 1, wherein the degree of sulfonation of S-PAEKS is in the range of 5% to 95%.

5. The exchange membrane of claim 1, wherein the degree of sulfonation of S-PAEKS is in the range of 45% to 75%.

6. The exchange membrane of claim 1, wherein S-PAEKs is selected from the group consisting of sulfonated poly(ether ketone) (S-PEK), sulfonated poly(ether ether ketone) (S-PEEK), poly(ether ether ketone ketone) (S-PEEKK) and sulfonated poly(ether ketone ether ketone ketone) (S-PEKEKK).

7. The exchange membrane of claim 1, wherein the modified maleimide oligomers have a hyper-branched architecture.

8. The exchange membrane of claim 1, wherein bismaleimide is selected from the group consisting of N,N'-ethylene-bismaleimide, N,N'-butylene-bismaleimide, N,N'-hexamethylene-bismaleimide, N,N'-phenylene-bismaleimide, N,N'-4,4'-diphenylmethane-bismaleimide, N,N'-4,4'-diphenylether-bismaleimide, N,N'-4,4'-diphenylsulfone-bismaleimide, N,N'-4,4'-dicyclohexylmethane-bismaleimide and N,N'-4,4'-phenyldimethyl-bismaleimide.

9. The exchange membrane of claim 1, wherein a molar ratio of bismaleimide to barbituric acid is in the range of 30:1 to 3:1.

10. The exchange membrane of claim 1, wherein a molar ratio of bismaleimide to barbituric acid is in the range of 20:1 to 10:1.

11. The exchange membrane of claim 1, wherein the reaction is performed under the condition that a solvent is present.

12. The exchange membrane of claim 11, wherein the solvent is selected from the group consisting of γ-butyrolactone, propylene carbonate and N-Methyl-2-Pyrrolidone.

13. The exchange membrane of claim 1, which has semi-interpenetration.

14. The exchange membrane of claim 1, which is as an ion exchange membrane.

15. The exchange membrane of claim 1, which is as a proton exchange membrane.

16. A membrane electrode assembly or a fuel cell comprising the exchange membrane of claim 1.

17. The exchange membrane of claim 1, wherein the S-PAEKS is a sulfonated poly(ether ether ketone) (S-PEEK).

18. The exchange membrane of claim 1, wherein the bismaleimide is N,N'-4,4'-diphenylmethane-bismaleimide.

* * * * *